United States Patent [19]

Burleson

[11] Patent Number: 4,564,458
[45] Date of Patent: Jan. 14, 1986

[54] METHOD AND APPARATUS FOR DISPOSAL OF A BROAD SPECTRUM OF WASTE FEATURING OXIDATION OF WASTE

[76] Inventor: James C. Burleson, 374 Dawn Hill, Friendswood, Tex. 77546

[21] Appl. No.: 649,907

[22] Filed: Sep. 12, 1984

Related U.S. Application Data

[63] Continuation of Ser. No. 550,357, Nov. 10, 1983, abandoned.

[51] Int. Cl.$^4$ .......................... C02F 1/74; C02F 11/08
[52] U.S. Cl. .................................... 210/747; 210/748; 210/761; 204/149
[58] Field of Search ............... 210/748, 758, 761, 774, 210/808, 177, 178, 181, 243, 149, 747, 762; 204/149

[56] References Cited

U.S. PATENT DOCUMENTS

| | | | |
|---|---|---|---|
| 3,111,983 | 11/1963 | Frank | 210/758 |
| 3,449,247 | 6/1969 | Bauer | 210/761 |
| 3,606,999 | 9/1971 | Lawless | 210/761 |
| 3,753,886 | 8/1973 | Myers | 204/149 |
| 3,853,759 | 12/1974 | Titmas | 210/761 |
| 3,974,075 | 8/1976 | Saigh | 210/149 |
| 4,272,383 | 6/1981 | McGrew | 210/761 |
| 4,338,199 | 7/1982 | Modell | 210/761 |
| 4,387,030 | 6/1983 | Saunde | 210/774 |

OTHER PUBLICATIONS

Using Supercritical Water to Destroy Tough Wastes, Chemical Week, McGraw Hill, Apr. 21, 1982.
Julian Josephson, Environment Science and Technology, vol. 16, No. 10, 1982, pp. 548A–551A.
McCarthy, "Technology Assessment of the Vertical Well Chemical Reactor," EPA–600/2–82–005, U.S. Environmental Protection Agency, Cincinnati, Ohio.
Perry's Chemical Engineering Handbook, Fourth Edition, McGraw Hill, 1969, (25-41)–(25-43).
Timberlake, "Supercritical Water Oxidation for Waste Water Treatment, Preliminary Study of Urea Destruction", SAE Technical Paper Series 820872, San Diego, California, Jul. 21, 1982.

*Primary Examiner*—Ernest G. Therkorn
*Attorney, Agent, or Firm*—Gunn, Lee & Jackson

[57] ABSTRACT

In the preferred and illustrated embodiment, a deep well is utilized to form a reaction chamber for combustible waste in water. A stream of water born combustible waste is delivered into a deep well, sufficiently deep to obtain a pressure and temperature in a bottom located reaction chamber at which the water becomes supercritical, there being a pipe for delivering oxygen under pressure for combusting oxygen dissolved in the supercritical water with the waste materials. The reaction is exothermic to sustain itself. It is started preferably by electric current flow to initially raise the temperature in the reaction chamber. The preferred structure is a cased abandoned well having a surrounding cement bond to the formation thereby retarding heat lose into the formation, the bottom located reaction chamber sustaining supercritical conditions.

13 Claims, 1 Drawing Figure

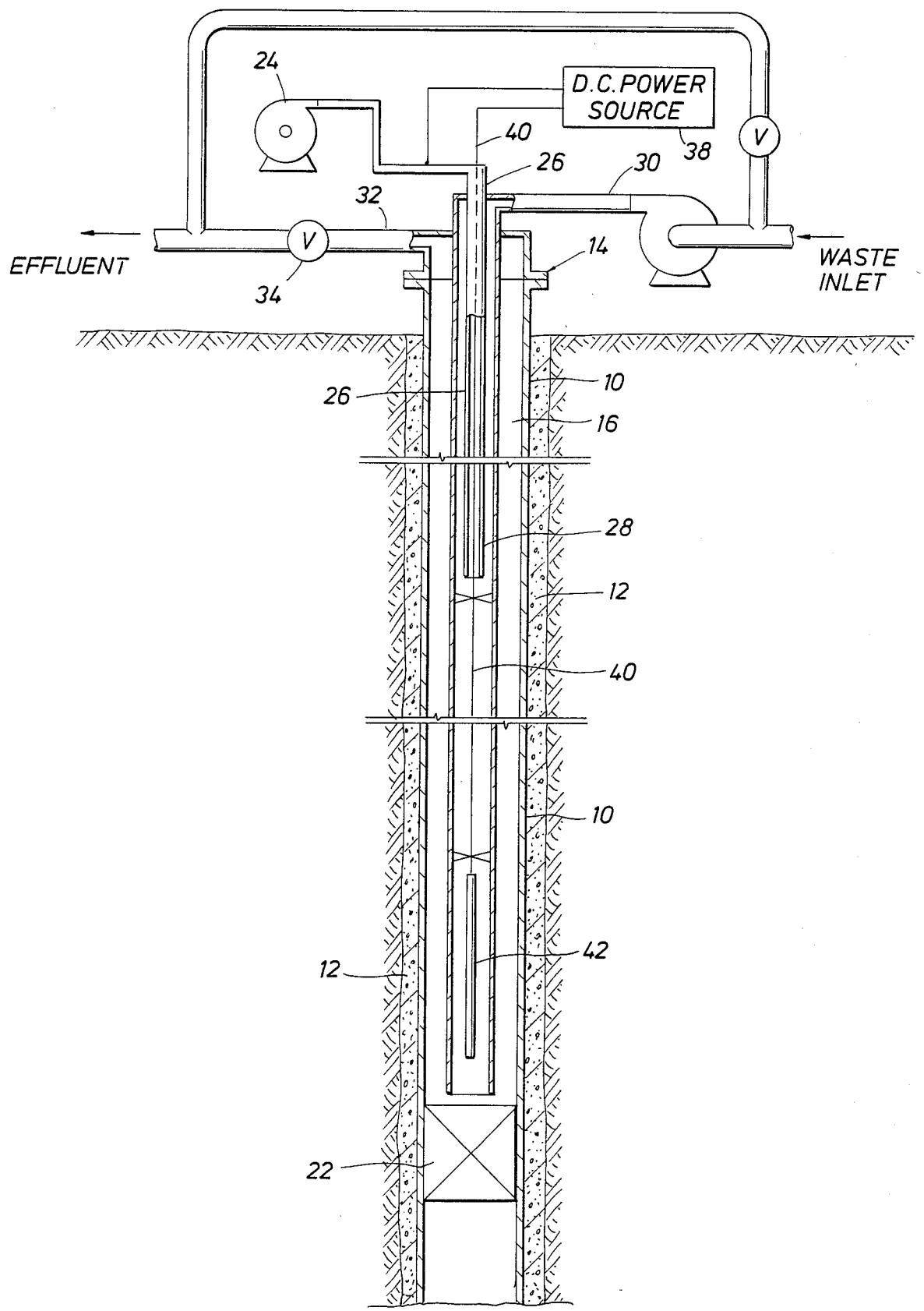

METHOD AND APPARATUS FOR DISPOSAL OF A BROAD SPECTRUM OF WASTE FEATURING OXIDATION OF WASTE

This is a continuation of Application Ser. No. 06/550,357 filed Nov. 10, 1983, now abandoned.

BACKGROUND OF THE DISCLOSURE

In an industrial plant context, there is a risk of formation of a relatively broad spectrum of waste. The term waste is used as a fairly broad term to refer to an accumulation of organic waste. One such organic waste includes sewage or sludge from a municipal sewage treatment facility. Accordingly, it will include high bacteria counts. Another material in the term waste as used herein is a relatively broad spectrum of various hydrocarbons. The hydrocarbons typically will include in random fashion various halogens, sulfur, the various light metal elements such as sodium and the like. It may also include the heavier metal ions typically deemed to be capable of metallic poisoning including compounds of lead, mercury and the like. Disposal of this type of waste covers a spectrum of needs including the necessity of killing the bacteria, breaking down the hydrocarbons, recovery of various salts and the like. In this context, the term waste therefore includes the typical waste products enumerated above. Other waste may well be added, and the mix or percentage of the various waste constituents can vary quite widely.

One proposed system for handling waste of this nature (perhaps more narrowly defined) is *SAE Technical Paper* 820872 bearing the title "Supercritical Water Oxidation for Wastewater Treatment: Preliminary Study of Urea Destruction" which bears the date of July 19-21, 1982. This paper describes an apparatus for use with extended duration space missions. It shows apparatus in FIGS. 1 and 2 thereof. It is the sort of device of rather narrow value as would be evident from its use in spacecraft. Another technical article is entitled "Supercritical Fluids" from pages 548A-551A, Volume 16, No. 10, *Environmental Science & Technology* published by the ACS. This technical paper involves the same personnel as were involved in the SAE paper mentioned above, and sets forth a device which can handle specified waste.

Patents of note include Bauer U.S. Pat. No. 3,449,247. This shows a wet oxidation procedure. A more recent patent is that of Lawless which bears U.S. Pat. No. 3,606,999. In this disclosure, a system for utilizing elevated pressures and continuous flowing streams (large volume) is set forth. The more recent patent of Titmas U.S. Pat. No. 3,853,759 is also noted.

The present disclosure sets forth both a method and apparatus for handling the large spectrum of waste described above. This disclosure sets forth an advantageous method and procedure utilizing an abandoned cased well. The term well is defined hereinafter as a well which is cased sufficiently to avoid damage to adjacent formations by bleeding the waste into the formations. Typically, this refers to a well which has been cased with the casing bonded to the adjacent formations by means of cement placed between the casing and the formation. To a large degree, the cement is also used as an insulator. It is preferably an insulator for the well to define a reaction chamber at the bottom of the well. The well is sufficiently deep that pressure at the bottom obtains a pressure above about 3200 psi. The water borne waste is heated sufficiently above 380° C. and pressurized to an excess of about 3200 psi to be in the range where it is supercritical. In this range, gases dissolve quite readily into the water, and normally insoluble organics including greases and oils become soluble.

Such pressures can be achieved in relatively expensive reactor vessels. For instance, one such reactor vessel is offered by Modar, Inc., the firm described in the first of the two references mentioned above. Another type of vessel is an autoclave which is used by the firm known as Zimbro, Inc. of Rothschild, Wis. The various reactor vessels are relatively expensive to fabricate. They must of necessity sustain at least an internal pressure of 3200 psi. Providing over design, perhaps they can be designed for 3500 psi. Using that target pressure, the vessels are typically designed for even higher pressures to provide a safety margin and hence, they typically will have pressure ratings of 5000 psi or more.

Such a high pressure rating is inevitably expensive when translated into equipment. This typically requires the design and fabrication of relatively rugged pressure vessels. Such a pressure vessel is inevitably also small. For instance, the Modar equipment typically contemplates about 50 gallons per day throughput. While the model might be scaled up, there is a point of diminishing returns for cost. For instance, the capacity of a pressure vessel can be doubled with only a modest increase in the radius of the pressure vessel, that vessel being assumed to be a cylindrical structure. Even so, this leads to a ceiling or limitation in terms of the practical size of the plant. Plant size inevitably relates to throughput capacity. Moreover, such a plant typically must be continually fed with heat to sustain the temperatures which are necessary for operation. Inevitably, provision of the heat is expensive.

The present method and apparatus handles this matter entirely differently. This invention proposes the use of abandoned oil wells. They typically are drilled sufficiently deep to enable supercritical pressures to be obtained in the bottom area. In the event they are not that deep, they can nevertheless be used because the feed can be pressurized. Accordingly, the pressure at the bottom can be raised by incrementing the standing column of water with a pressure boost at the surface. Utilizing a rough rule of thumb that the pressure is increased by about one psi for every two feet of column height, a well which is approximately 6400 feet deep will furnish a bottom hole pressure of approximately 3200 psi. This can be done without pressurizing the well at the top. In this light, it should be recognized that the well encloses a standing column of water which increases the pressure to supercritical in the bottom or reaction area. The standing column is thus selectively boosted by providing a pressure head thereabove. While this pressure head does involve the installation of pressure retaining tanks, valves and the like connected at the well head, they are typically not so expensive as is the equipment necessary to contain 3200 psi at the surface. Rather, the surface equipment might provide a pressure boost of perhaps 500 psi. This would be helpful in a well that might be only 5400 feet deep.

As will be understood, the term pressure vessel is somewhat relative in this context. It is intended to refer to the bottom portions of an abandoned well. Preferably, the abandoned well is cased to prevent migration into the adjacent formations. Moreover, the casing is cemented in place to assure that the chamber at the bottom of the abandoned well will be available for continuous duty, use and operation. This is particularly important to enable industrial waste which typically is provided in an unending flow to be treated by cycling the waste through the apparatus of this disclosure.

This apparatus should be particularly considered from the point of view of start-up procedures. As will be described, the procedure is exothermic. However, assume for purposes of description that it is to begin with a column of water at ambient temperature placed in a wellbore. Assume for descriptive purposes that the wellbore is 8,000 feet deep. Assume further that it is enclosed in a casing and the casing is cemented in place. Assume further that the bottom of the well is plugged at 8,000 feet. This apparatus particularly sets forth a procedure for initiating operation. A centrally spaced bare conductor is located in the reaction chamber. The chamber is at 7,500 feet to 8,000 feet. This bare conductor injects a current flow which flows radially outwardly in the chamber. The conductor incorporates an insulated sheath extending from the surface down to the reaction chamber. In the reaction chamber, the bare conductor is centrally located and is held by standoff posts to assure that it does not contact the surrounding tubing. Moreover, it has an exposed length enabling radial current flow along the chamber. For instance, it can be centrally spaced by standoff posts made of insulated material not susceptible to breakdown, and the conductor and chamber might be fairly long, say 100 meters in length. If the tubing is approximately $7\frac{5}{8}$ id, preferably the conductor is sized and centered more or less along the center of this chamber. This enables the conductor to flow a current radially outwardly through the highly conductive material which surrounds the electrode.

The method of the present disclosure particularly sets out a procedure whereby the surrounding fluid is exposed to heating from current flow. As heat is liberated, the surrounding fluid is heated. As the temperature rises, flow of electric current is increased thereby further raising the temperature. In fact, current flow increases as a result of decrease in electrical resistance. Eventually, the temperature is raised by the electrical resistance heater arrangement to supercritical. Heat that is liberated from the exothermic oxidation thereafter sustains the temperature level. This oxidation of course goes further in disassociation of the complexes which form the waste. Bacteriological waste are completely sterilized by death and destruction of the bacteria.

The present invention takes advantage of the relative degree of insulation which is found in a cased and cemented well borehole. In deeper wells, the bottom hole temperature inevitably increases typically at a rate of about one degree F. per 100 feet depth. This increase provides a minor boost to the temperature of the fluid pumped to the bottom. More importantly, the heat transfer characteristics of the surrounding formation in conjunction with the cased and cemented borehole enables retention of heat to assure that the water in the reaction chamber is sustained at supercritical conditions. To this end, the water is mixed with injected air to thereby define a system wherein gaseous fluids are dissolved substantially with total solubility in the water, or restated, the water borne wastes and gases are perfectly soluble. The surface tension is reduced at supercritical to enable nearly perfect mixing, and fully contacts oxygen with the water borne waste materials. Oxygen can penetrate the smallest pores in particulate matter and oxidize all available material. This accelerates the combustion of the waste.

The by-products of waste consumption include carbon dioxide, additional water, formation of various salts including both soluble and insoluble salts. Basically, all cell life is destroyed. The discharge is therefore more readily handled. Toxic poisons, dangerous toxins and the like are avoided and the discharge is inevitably handled much easier. The discharge may include heavy metal salts which might have to be removed to provide a relatively clean effluent. This poses no problem in contrast with the problem that exists before treatment.

The foregoing sets forth both the method and apparatus of the present disclosure in very general terms. The procedure of use is also generally described. It will be appreciated that a better understanding of the present invention can be obtained on review of the drawings found below and the written disclosure.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawing.

It is to be noted, however, that the appended drawing illustrate only typical embodiments of this invention and are therefore not to be considered limiting of its scope, for the invention may admit to other equally effective embodiments.

The single drawing is a sectional view through a cased and cemented oil well showing a pressurized reaction chamber for liquid oxidation of waste.

DETAILED DESCRIPTION OF THE PREFERRED EMBODIMENT

Attention is directed to the single drawing which shows a cased and cemented abandoned well. The numeral 10 identifies a conventional casing which is placed in the wellbore. It is held in position by an external jacket of cement 12, the casing being cemented in the borehole. The cement has a specified depth of penetration beyond the casing 10, this depth being sufficient to adequately secure the casing in location and to also prevent migration along the exterior of the casing between various strata penetrated by the borehole. The well has a typical diameter dependent on the size of the drill bit which is used to form the well. Preferably, the well is in excess of 8,000 feet. The well at a depth of 8,000 feet provides a standing column of water which yields an adequate downhole pressure as will be described. A column of water at 8,000 feet tall, 705° F. at the bottom will require a pressure boost of about 350 psi to overcome reduced density resulting from the increasing temperature. Greater well depth reduces surface pressure boost.

The casing 10 is sealed at the top by a closure member 14. Various and sundry fluid conduits and electrical conductors pass through the top. Seals of a suitable nature prevent leakage around the top. Moreover, the closure member defines the interior of the cased well as a pressure chamber, and this is identified in the upper reaches of the well by the numeral 16. There is a reaction chamber 20 at the bottom of the well, this being located above a plug 22 positioned in the casing. The depth of the well is indefinite. Inasmuch as the well can be deeper, the plug 22 can be located at the bottom of the casing or substantially above the bottom end of the cased hole. Excess hole can be plugged off and isolated. The plug 22 is positioned within the bottom 100 feet of the casing.

Returning again to the upper end of the well, a source of air is connected to a pump 24 and is pumped through a tubing string 26. The tubing 26 extends to about 2,000 feet where the discharge nozzle 28 is located. The oxygen is bubbled into the water; the oxygen dissolves better above 233° F., the temperature of minimum solubility. The discharge nozzle for the tubing 26 is concentrically within the waste stream tubing 30. The tubing 26 delivers air from the pump under pressure as will be described. The air is discharged through the nozzle 28 into the flowing waste stream.

Suitable waste is introduced into the well by means of a waste supply line 30. This concentric tubing extends to the very bottom, giving perhaps six inches clearance over the plug. The clearance directs the flow to scour the bottom and flush all sediment, flowing with the effluent to the surface. Typically, the waste includes those materials which are exemplified hereinabove. Moreover, they are delivered into the well in solution or as a slurry. Typically, the waste stream is substantially water with waste components ranging from parts per billion on up to very high concentrations. Assume for the moment that the waste stream is primarily water with waste therein including living cells or organisms. Assume further that the waste stream includes a mixture of random description. The mixture is generally characterized as including HCMSN. The foregoing is not a chemical formula but simply represents the typical elements found in the compounds comprising the waste. Accordingly, HC refers to various hydrocarbons, M refers to metals (sodium as a light example while mercury is an example of a heavier metal), S is sulfur and N refers to other elements. Examples of other elements may include various halogens. The waste materials will include both organic and inorganic compounds.

The waste is introduced through a supply line 30. The supply line should be extended substantially toward the bottom. This assures that the waste material (HCMSN) is delivered to the reaction chamber 20. Typically, the reaction chamber is 100 to 500 feet tall.

The closure member 14 connects with an outlet line 32. The line 32 connects through a regulator valve 34. The valve 34 assists in discharging treated material. Preferably, the treated material simply flows to the top of the well and is discharged.

The regulator valve maintains back pressure. It is desirable that the pressure at bottom hole be maintained in excess of the pressure necessary to assure that water is at a supercritical state. This pressure is about 3200 psi. In actuality, it is given in various journals as being 218.3 atmospheres. At this level of pressure, and at a temperature exceeding the critical temperature as described below, the density, bonding with various molecules including hydrogen, and other physical properties of the water are altered. So to speak, the water then behaves more as a polar organic liquid. At this juncture, solubility of the water is markedly changed. Water is an extremely good solvent for organic substances at this level. That is, oils and greases are miscible with water at this temperature and pressure. Moreover, the density of the water is reduced while inorganic salts become only slightly soluble. Not only do organic compounds (especially including oils and greases) become soluble in water at this state, but oxygen also becomes completely soluble in water. In summary, at the supercritical point, the gases carried in the water and the water itself become completely dissolved in one another. It is at this point water in both the liquid and vapor phases has identical density. Inorganic salts are not soluble in supercritical water. They tend to settle out and are picked up and entrained by the flow, carried toward the surface and partially dissolve as the water temperature is reduced. Such salts are normally discharged without collecting at the bottom.

The carbon and hydrogen in hydrocarbon waste is rapidly oxidized. Products of oxidation thus are formed and include carbon dioxide and more water. These pose no problem in disposal. Assuming that there are also halogens or perhaps metals in the waste, they form salts. These salts typically fall out and will be redissolved as the flow approaches the surface. Flowing water will entrain these along and out of the well as will be described.

In the event that living cells are delivered in the waste flow, they are, first of all, typically killed by elevated temperature even before they get to the chamber 20. As a second step, they are killed and oxidized by the reaction going on in the reaction chamber.

Heating of the reaction chamber 20 should be considered. Briefly, the numeral 38 identifies a voltage source. One side is grounded to the casing and the other side is connected to a conductor 40. The conductor 40 extends to the reaction chamber. The conductor 40 is sheathed or wrapped in an insulator so that there is no current flow from the conductor 40 along its length. It is however exposed at a tip 42. This tip is located in the reaction chamber. The tip is exposed to flow electric current radially outwardly toward the casing 10. A path to ground is thus formed through the surrounding liquid and into the casing. Current flow from the tip 42 is used to start the reaction. Consider as an example the following situation. Assume that the bottom hole quiescent temperature of the surrounding earth is in the range of 70°–80° C. Assume further that the well has been filled by standing water to a height so that bottom hole pressure does exceed approximately 3200 psi. At this juncture, it is simply a standing column of water. Admittedly, it may be heavily laden with various waste products, the analysis thereof not being critical to this description. At this juncture, presumably the dialectric constant of the water around the tip 42 might be as high as 80. However, there may be a sufficient quantity of conductive material in the waste to lower the dialectric constant to something less than 80. It is not important to the startup conditions that the dialectric constant be reduced from 80, and hence 80 will be assumed to provide a worse case description. Flow may be temporarily reduced at start up to heat the charge of water at the reaction chamber.

Current flow is initiated from the conductor tip 42. The current flow is radially outwardly. The current flow liberates heat. Recall that the well is surrounded by the cement 12. Recall further that it is encased by the surrounding earth's formations. While some heat is conducted away by the metal casing 10, the heat which is liberated in the vicinity of the tip 42 is substantially captured. After the current has flowed for a substantial interval, sufficient heat has been concentrated in the reaction chamber 20 to raise the temperature of that chamber. Again, assuming that it began at ambient temperature typically in the range of 70°–80°, the temperature will be elevated until it approaches the critical temperature. Inevitably, the temperature level ultimately approaches 374° C. which is the supercritical temperature. The increase in temperature produces a more or less linear drop of dialectric constant. Thus, the dialectric constant typically is about 80 at a temperature of about 25° C. The dialectric constant will sag, eventually dropping to under ten for water near supercritical temperatures. This drop reduces the current required and accelerates the accumulation of heat in the chamber 20. Soon, the reaction chamber is brought to a supercritical condition. This fluidizes all the waste molecules in the area of the chamber 20, that is, those molecules exposed to supercritical water for oxidation. The start up may be with nearly pure water; if the water has waste available for combustion, even more heat is liberated to speed up the process.

The pump 24 is switched on at the beginning of operation. In a degree, slight oxidation is obtained even before supercritical conditions are achieved. Air under pressure is forced through the conduit and is discharged at the tip 28. It should be noted that the air does not merely bubble from the tip. As supercritical conditions are approached, the solubility of oxygen in water increases markedly to reduce bubble size as the air is dissolved. The oxygen is simply dissolved into the water and is therefore available for oxidation of the waste molecules including HCMSN. At this juncture, wet oxidation is conducted in the water. The waste laden water flows to the bottom of the well, conducting oxygen along with it. Keep in view that the water is confined and hence is not able to flash into steam. In this state, the supercritical nature of the water is best defined by describing the water as a supercritical fluid, certainly not a liquid. There is a change in density of the water in the chamber 20. However, it remains underneath the standing column of water. At supercritical conditions, the density eventually passes through the critical density of water which is 0.325 grams per cubic centimeter. A continual flow of air (or oxygen if a more expensive approach is desired) is input with the continual flow of water including waste. Water is then discharged at the top through the relief valve 34. The relief valve is adjusted to maintain a suitable back pressure on the system. This assures that the supercritical pressure is maintained in the chamber while dynamic inflow and outflow are maintained.

This pressure should be deemed to be a pressure in excess of 3200 psi. This pressure is obtained by utilizing the well at a depth where such a pressure is sustained. If the well is not deep enough, then the back pressure valve 34 maintains a sufficient pressure head on the well. If the well were shorter, back pressure must be maintained on the system to assure that the pressure in the reaction chamber 20 is in excess of 3200 psi. If the well is deeper, the back pressure can be practically reduced to zero.

It is desirable that the waste stream be supplied with a substantial portion of oxidizable organic materials. The term oxidizable here should not be interpreted to refer to those materials which are necessarily combustable with oxygen in air. Rather, it refers to those materials which can be oxidized in the chamber 20 even though that conversion occurs under water, so to speak. Once oxidation starts with waste introduced into the chamber 20, such oxidation can continue. This enables the electric power source to be switched so that reduced current is needed. The electric heating provides the short fall, if any. In one sense, the procedure is self-sustaining. That is, sufficient heat is liberated by the combustion of the HCMSN in the vicinity of the chamber 20 that the chamber 20 is maintained at the supercritical temperature. It is desirable that the temperature be sustained typically in the range of 374° C. to about 400° C. It is wasteful of energy to exceed this temperature level. However, it is important to note that electric current can be thermostatically controlled, even avoided after the start of combustion of the waste materials.

The process is thus self-sustaining. It is ideally self-sustaining by the continued introduction of a sufficient flow of combustable organic waste. The precise quantity required is typically relatively small, down in the range of just a few percent of the total throughput of the system. Thus, if the waste supply comprises approximately 0.02% to 5% of waste materials, then sufficient waste are input to enable combustion to continue ad infinitum. The flow rate and concentration are the determining factors. With an assumed thermal loss for the well, a flow of 500 gallons per minute having about 200 ppm combustible hydrocarbons will sustain operation.

When this state of affairs is achieved, the system operates without additional energy input at least to maintain supercritical conditions. The only inputs that are then required are the power inputs to the pumps. Because the waste is typically delivered in aqueous solution, and air is also required, the two pumps constitute the sole mechanisms consuming energy to sustain operation.

Some of the heat which is generated in the chamber 20 is lost into this surrounding earth. It is possible that the well will be sufficiently insulated so that the purified waste stream 35 which is discharged is in fact substantially pure and it may be sufficiently hot that some energy can be recovered from it for operation of the pumps or other equipment. Thus, as long as a waste feed is provided for the conversion apparatus, it is substantially self-sustaining.

As a practical matter, a small current flow protects the tubing and casing. At elevated temperatures and pressures experienced in the well, the oxygen and particularly carbon dioxide dissolved in the water may attack the metal pipe. Corrosion resistant stainless steel is expensive; less expensive mild steel can be used if protected by a cathodic electrode system. This is dependent on the conditions; accordingly, the bottom fraction of pipe and tubing is preferably protected in this fashion.

The downward flow of the feed water and upward discharge of heated water define a counter current heat exchange. The counterflows enable an adiabatic equilibrium to be sustained. The hot water discharge may deliver several million BTU per hour. A feed water pre-heater can use this heat to heat the feed water rather than waste the heat. In fact, dependent on the combustible fuel in the water, the heat discharge of the well may exceed the energy required to operate the well, that energy being primarily pump power. This can be altered by changing the feed rate of fuel.

Safety is enhanced by placing the high pressure reactor chamber underground. The alternate choice is high pressure, high temperature surface located equipment. Safety is assured by isolating the high pressure region underground. Costs are also reduced by this arrangement.

The well is, in a general sense, an insulated chamber. That is, there is minimal lost water flow out of or into the well. Also, there is controllable or limited heat loss, typically by virtue of the cement around the pipe. Further, the chamber at the bottom of the well is surrounded by subsurface formations at an elevated temperature, reducing the temperature differential and hence, the heat loss.

In general terms, the foregoing sets forth the procedure of operation. Heat is momentarily supplied to initiate a temperature rise to supercritical conditions. After this had been accomplished and once the cycle of operation begins, the flow of water discharged from the well is substantially pure. That is, the mix of waste which were input to the well have been substantially converted. The outflow of water carries with it carbon dioxide as a result of combustion of various hydrocarbons. Salts will be carried in the outflow. Purification of the water which is discharged through the relief valve 34 is thus quite easy. Primarily, it carries with it typical metal salts such as salts of mercury, sodium and like. This, of course, varies dependent upon the actual analysis of the waste which is input to the well.

While the foregoing is directed to the preferred embodiment, the scope is determined by the claims which follow.

What is claimed is:

1. A method of wet oxidation of organic waste materials in waste water comprising the steps of:
  (a) flowing a stream of waste water including organic waste materials into an insulated well;
  (b) compressing a flow of oxygen to be injected into the flowing stream of waste water;
  (c) extending the flow of waste water to a depth such that pressure in the insulated well is increased to the pressure required for supercritical water;
  (d) initially heating with a separate control means the waste water at the bottom of the insulated well by flowing an electric current through the water at the bottom of the insulated well to generate resistance heat for the water to initiate oxidation for sustaining supercritical conditions in the insulated well;
  (e) oxidizing the organic waste materials in the waste water to liberate heat in the insulated well to sustain the temperature required for supercritical water wherein the initial heating step with the control means is ended after the oxidized wastes sustain exothermic oxidation; and
  (f) over a period of time, injecting the flow of oxygen into the insulated well with the waste water, and also removing water from the insulated well to enable continuous oxidation of waste in the insulated well at supercritical conditions to sustain supercritical temperatures.

2. The method of claim 1 including the step of flowing an electric current through the water to metal pipe in the well to provide cathodic protection.

3. The method of claim 2 including the step of flowing the water to the bottom of the insulated well through a first pipe and directing the flow of water from the bottom in another pipe to flush insoluble sediment from the bottom.

4. The method of claim 1 including the step of flowing compressed air along the well to a specified depth to bubble the air into the flowing waste water stream and flowing the stream with entrained air to a greater depth in the well until the oxygen in the air is dissolved and oxidizes the organic waste materials wherein the oxygen dissolves with reduced surface tension in the waste water.

5. The method of claim 4 wherein air is discharged into downwardly flowing waste water preheated by upwardly flowing waste water from the bottom of the insulated well.

6. The method of claim 4 wherein the insulated well has a bottom defining plug means at a depth determined by the well depth and wherein the well holds a standing column of water, the column of water defining a pressure at the plug means, and including the step of applying supplemental pressure at the well head to obtain supercritical pressure at the plug means.

7. The method of claim 6 including the step of closing the well with a wellhead closure means and wherein pipe means extend into the well, there being an inlet and outlet waste water pipe flowing means.

8. The method of claim 7 including the step of regulating well head pressure to vary pressure at the bottom of the well.

9. The method of claim 8 including the step of injecting air to obtain compressed oxygen.

10. The method of claim 9 including the step of injecting waste water along the well in a first pipe surrounded by an annular pipe removing treated water from the well.

11. The method of claim 10 including the step of connecting a DC source to ground at the surface of the well and connecting via a wire conductor a current flowing electrode to said source, said electrode being positioned in a chamber at the bottom of the insulated well to conduct current from the electrode through water in the chamber to heat the water, and thereafter reducing current flow to form a cathodic protection current flow in the chamber.

12. The method of claim 11 including the step of insulating the wire conductor between the DC source and the electrode to limit current flow to the chamber at the bottom of the insulated well.

13. The method of claim 1 including the step of flowing direct electric current through the downward flow of the waste water below the point of oxygen injection extending to the bottom of the reaction chamber to cathodically protect apparatus in the well.

* * * * *